July 16, 1940.    J. B. VICTOR    2,208,482
GREASE RETAINER WITH INTEGRAL DIAPHRAGM AND OUTER SEAL
Filed Aug. 19, 1936    3 Sheets-Sheet 1

JOSEPH B. VICTOR
INVENTOR

PER *Albert J Fihe*

ATTORNEY

July 16, 1940.   J. B. VICTOR   2,208,482
GREASE RETAINER WITH INTEGRAL DIAPHRAGM AND OUTER SEAL
Filed Aug. 19, 1936   3 Sheets-Sheet 3

JOSEPH B. VICTOR
INVENTOR

PER   Albert J. Fihe
ATTORNEY

Patented July 16, 1940

2,208,482

UNITED STATES PATENT OFFICE 2,208,482

GREASE RETAINER WITH INTEGRAL DIAPHRAGM AND OUTER SEAL

Joseph B. Victor, Oak Park, Ill., assignor to Victor Manufacturing & Gasket Company, Chicago, Ill., a corporation of Illinois Application August 19, 1936, Serial No. 96,772

7 Claims. (Cl. 288—3)

This invention relates to an improved grease retainer or fluid seal, and has for one of its principal objects, the provision of such a seal, particularly adapted for use with automobiles or the like wherein the diaphragm or sealing element which surrounds the shaft is extended to produce an outer seal with the housing in which the shaft is positioned.

One of the important objects of this invention is to provide a combination sealing element composed of a metal shell and a flexible diaphragm wherein the ordinary metal-to-metal contact between the metal shell of the seal and the interior face of the housing is eliminated.

Another object of the invention is to produce a supplemental sealing means between the outer rim of the grease retainer shell and a surrounding housing so that a complete metal-to-metal contact will be eliminated and a more flexible and cushion-like sealing structure result which shall tend to reduce loss of oil by leaks between the shell and the housing due to eccentricity, improper fitting or the like.

A still further object of the invention is the provision in an oil seal or the like of means for automatically compensating for any eccentricities or other imperfections between the grease retainer shell and the housing into which it is driven.

Other and further important objects of the invention will be apparent from the disclosures in the accompanying drawings and following specification.

The invention, in a preferred form, is illustrated in the drawings and hereinafter more fully described.

Figure 1:
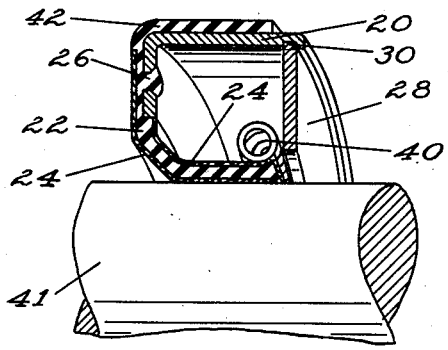
Figure 1 is a sectional view of an improved type of oil seal embodying the principles of this invention.

The reference numeral 20 indicates generally the improved metal shell of the new grease retainer or oil seal of this invention, the same being in the form of an annular cup L-shaped in cross-section as shown in Figure 1.

The diaphragm or sealing means is composed of an inner layer 22 of plastic or the like and outer layers 24 of some fabric or similar material, the same being vulcanized to the metal of the shell 20 during the process of manufacture, as the material thereof is generally a synthetic rubber which can be molded at will. The molding operation expresses a part of the diaphragm while in the plastic state through an opening 26 in the shell, and the synthetic rubber or the like will actually contact and closely adhere to the metal of the shell 20, thereby forming a very good oil-tight joint. A washer 28 is positioned in the outer face of the shell 20 by chamfering or the like as shown at 30, and a coil spring 40 is employed to keep the diaphragm in proper co-acting relationship with the shaft 41 at all times. The washer 28, in addition to forming a surface against which blows can be directed in inserting the seal in position, also operates to hold the spring 40 in desired relationship with respect to the diaphragm and the shaft which it surrounds.

A feature of this invention resides in extending or elongating a portion 42 of the diaphragm over and around the edge of the seal and vulcanizing this portion 42 onto the outer face of the rim of the cup-shaped element 20 whereby an additional sealing means is provided and one which is much more satisfactory than the usual metal-to-metal contact which heretofore has been considered the only feasible means of making a seal.

Experience has proven that metal-to-metal contact such as this will frequently leak, these leaks being due to various causes, particularly eccentricities or out-of-roundness in either the housing or the shell or perhaps to tool marks, scratches and the like in either or both of the elements. That portion of the diaphragm 42 which is molded or vulcanized onto the outer face of the shell 20 will thereupon fit against the inner face of the housing for which the retainer is intended, forming a more cushion-like and compressive action which, while securely maintaining the grease retainer in desired position, will also function as an improved sealing means.

Figure 2:
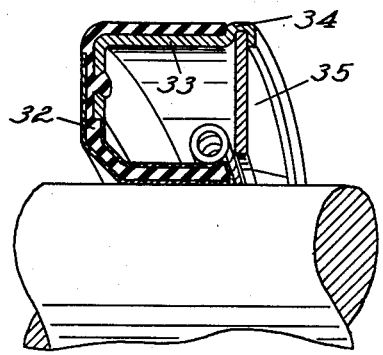
Figure 2 shows a slight modification.

In Figure 2, the diaphragm 32 is vulcanized to a shell 33 which has an offset portion 34 into which a washer 35 is seated and held in position by a spinning down of the edge 34 as shown. In this case, the diaphragm is also brought around the outer face of the shell 33 forming a better sealing relationship between the metal of the shell and the metal of the housing while at the same time a small portion of the shell is allowed to contact the housing.

Figure 3:
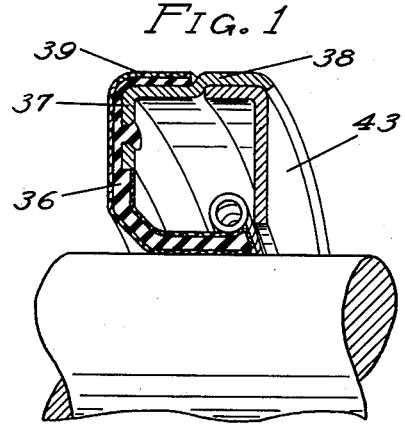
Figure 3 illustrates a further modification.

In Figure 3, another type is shown wherein the diaphragm 36 is molded to a cup-shaped shell 37 which is offset at 38, thereby providing a surface half of metal and half of plastic composition as shown at 39 whereby a combined sealing contact will be effected. A spring-retaining washer 43 is used with this type of shell.

Figure 4:
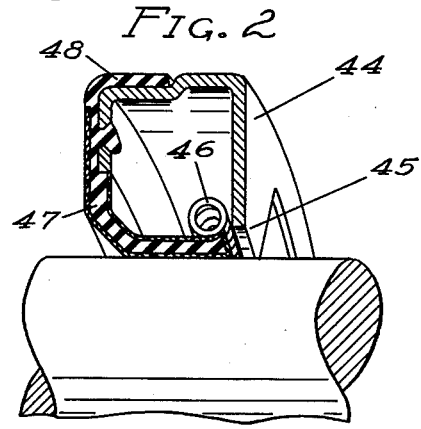
Figure 4 is a further adaptation of the structure shown in Figure 3.

In Figure 4, the shell 44 is made all in one piece having tongues 45 bent inwardly to retain the spring 46 in position on the diaphragm 47, the diaphragm being molded to the shell as before and with one portion 48 extending around the outer edge thereof to provide an additional sealing surface with the surrounding housing.

Figure 5:
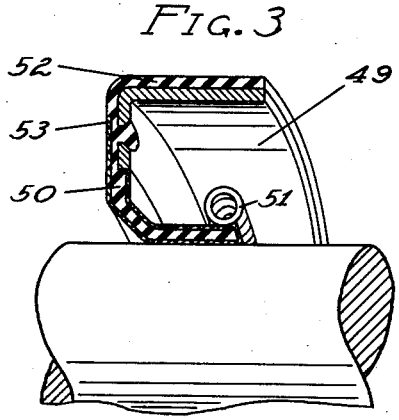
Figure 5 shows a grease retainer somewhat similar to that of Figures 1 and 2, but with the spring-retaining washer omitted.

A simplified type is illustrated in Figure 5 wherein an L-shaped shell 49 is provided with no outer washer, the diaphragm 50 being simply molded thereto as shown, and with the garter spring 51 applied to the diaphragm over the slight hump in the forward edge thereof, which in most cases will effectively retain the spring in position. In this type, the outer layer 52 of plastic has no fabric associated therewith, the fabric being stopped at a point 53 as shown.

Figure 6:
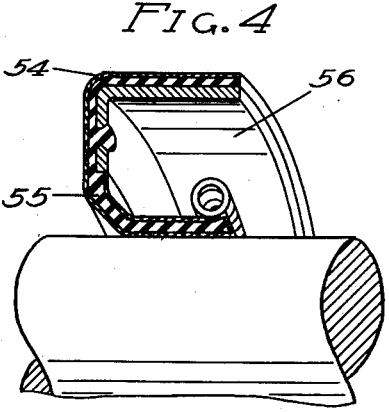
Figure 6 illustrates a further modification of the form shown in Figure 5.

In Figure 6, the structure is almost exactly similar to that shown in Figure 5 except that the fabric 54 of the diaphragm 55 extends completely thereover and around the outer edge of the shell 56, it being understood that the fabric is molded with and forms an integral part of the plastic composition of the diaphragm which usually is synthetic rubber but may be some other material.

In all of these structures, it will be noted that allowance is made for sufficient flexibility of the diaphragm in that the metal shell is apertured sufficiently over and above the diameter of the shaft to which it is to be applied so as to allow for a considerable flexing action of the associated diaphragm, thereby automatically compensating for eccentricities or irregularities in the movement of the shafts.

Figure 7:
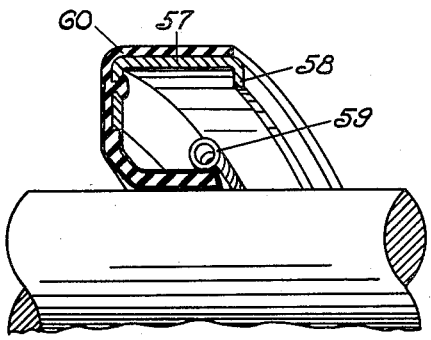
Figure 7 shows still another modification.

In Figure 7 is shown a structure somewhat similar to that of Figures 5 and 6 except that the shell 57 has an outer down-turned lip 58 which, however, does not extend down to the spring 59 but which does afford a stronger edge and also a surface against which pressure or blows may be directed in inserting or installing the seal. The diaphragm 60 extends out over the outer face of the shell as shown, and it will be noted in all these structures that openings are made in the shells into and through which the plastic material of the diaphragm is extruded during the process of molding and vulcanizing.

Figure 8:
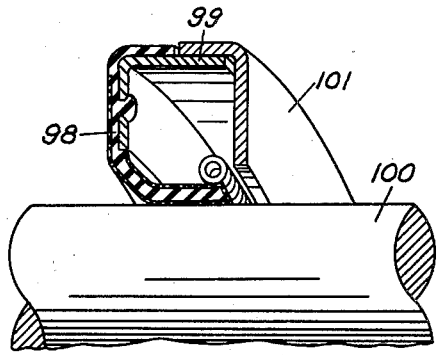
Figure 8 shows an important embodiment of the invention wherein contact with the housing is part metal and part composition.

In Figure 8, an embodiment of the invention somewhat similar to the structures shown in Figures 3 and 4 is illustrated wherein there is both a metal and composition contact with the inner face of a surrounding housing (not shown). It will be noted that the diaphragm 98 is molded into a cup-shaped shell 99 L-shaped in cross-section with a portion of the diaphragm adapted to sealingly contact a shaft 100. The diaphragm, however, does not extend completely over the outer surface of the shell 99, there being a further L-shaped shell 101 fitted over this portion of the inner shell, the shell 101 being also L-shaped in cross-section and preferably of slightly heavier metal than the material of the shell 99 and also somewhat thicker than the diaphragm element 98. This is particularly advantageous when the device is fitted into a housing as the metal of the shell 101 is compressed in position in the housing, the same being always made slightly oversize so far as the internal diameter of the housing is concerned, and the external diameter of the outer sealing portion of the diaphragm 98 is also made slightly larger than the internal diameter of the corresponding housing only not to so great an extent as the thickness of the metal 101.

Therefore, on application, the metal portion is compressed and as often times occurs in these installations, the surrounding housing may be somewhat out of round or have score marks or the like therein, in which event the metal-to-metal contact will permit leakage. The fact that the resilient material of the composition diaphragm 98 is also slightly compressed on application and which, furthermore, acts as a cork does when being positioned in a bottle, will eliminate and completely seal against any possible leaks which might occur between the adjacent metal portions.

Figure 9:
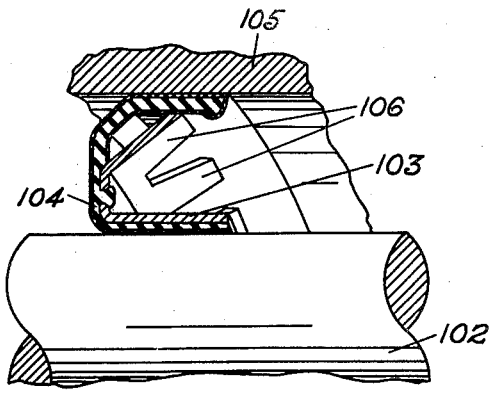
Figure 9 illustrates an embodiment of the invention wherein the seal as a whole is fitted into the revolving shaft, and the diaphragm or sealing portion contacts the inner face of the housing.

In Figure 9, the sealing element is adapted to rotate with the shaft 102 and consists of a metal shell 103 having a diaphragm 104 molded thereon, the same being then press-fitted onto a shaft with the outer periphery of the diaphragm adapted to sealingly contact the inner surface of a surrounding housing 105. Spring fingers 106 are made integral with the cup-shaped metal element 103 so that the outer periphery of the diaphragm 104 is always pushed outwardly and into proper sealing relationship with the interior face of the housing 105.

Figure 10:
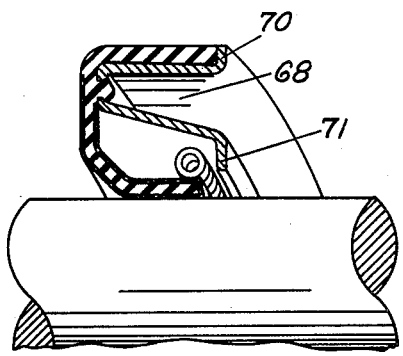
Figure 10 is a view somewhat similar to Figure 9 but showing a different type of steel shell.

A still further type is illustrated in Figure 10 wherein the shell 68 is somewhat V-shaped in cross-section as shown, one leg of the V having the plastic portion 69 of the diaphragm vulcanized thereto and the other leg being bent inwardly and through the diaphragm, both legs being bent outwardly at their edges, one to provide a protective edge 70 for the adjacent portion of the diaphragm 69 and also to provide a partial metal-to-metal contact with the housing. The other leg is bent downwardly as shown at 71 to maintain the spring in desired position.

Figure 11:
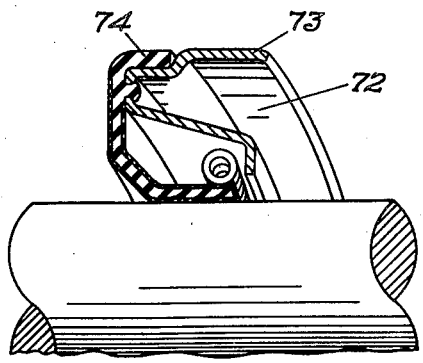
Figure 11 is a view similar to Figure 10 only illustrating a further modification of the invention.

A somewhat similar device is illustrated in Figure 11 wherein the V-shaped cup 72 is provided, a portion thereof being flared outwardly at 73 to provide a better metal-to-metal contact while another portion has the packing element 74 vulcanized thereto.

Figure 12:
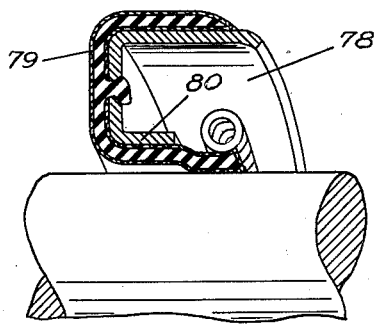
Figure 12 illustrates another simplified form.

A U-shaped shell 78 is shown in Figure 12, having a considerably greater surface for vulcanization of the diaphragm 79 thereto which extends around the outer edge as shown, and this shell has an inner flange 80 which is parallel to the shaft and which retains its associated part of the diaphragm at a spaced distance from the shaft.

Figure 13:
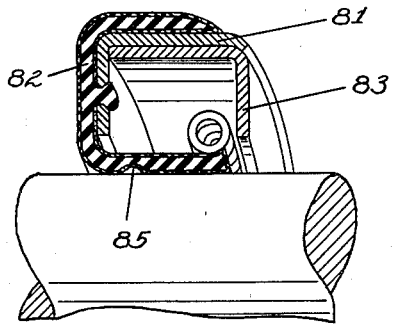
Figure 13 is a view similar to Figure 12 but showing a reinforced type of shell and a slightly different structure of diaphragm.

A further type is shown in Figure 13 wherein an L-shaped shell 81 has the diaphragm 82 vulcanized thereto, and the shell is reinforced by an inner cup-shaped element 83 also of metal which further acts to retain the garter spring in position on the diaphragm. This diaphragm has an offset portion 85 whereby a combination oil and dust seal structure is produced, the outer and smaller contacting surface providing a dust seal while the wider contacting surface seals against oil or grease.

Figure 14:
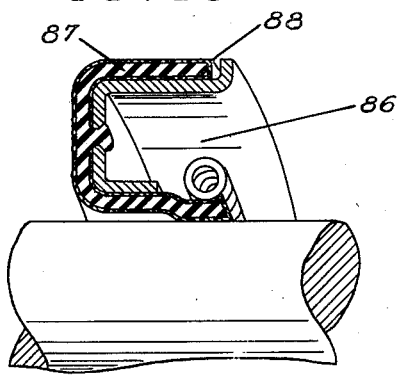
Figure 14 is a view somewhat similar to Figure 12 but showing the outer lip turned up and outwardly.

A structure somewhat similar to that shown in Figure 12 is illustrated in Figure 14, the main difference being that the outer edge of the U-shaped shell 86 is flared outwardly to protect the corresponding portion of the diaphragm 87 and also to provide somewhat of a metal-to-metal contact with the housing. A space 88 is provided between the end of the molded diaphragm and the flared edge of the shell 86 so as to allow for distortion or bodily shifting of the material of the diaphragm or packing.

Figure 15:
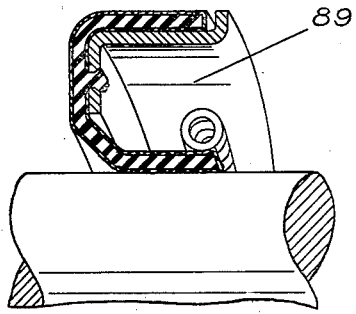
Figure 15 illustrates a structure somewhat similar to that of Figure 14 but with some of the metal structure cut away.

A very similar structure is illustrated in Figure 15, the shell 89 being cut away so as to allow more flexibility of the shaft-contacting portion of the diaphragm.

Figure 16:
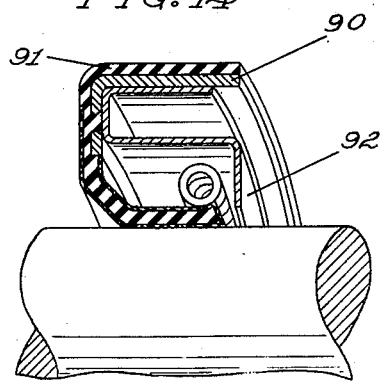
Figure 16 shows a still further embodiment of the invention somewhat similar to that illustrated in Figure 15 but made in two pieces.

In Figure 16, a supporting shell 90 is provided having the diaphragm 91 vulcanized thereto and an inner shell 92 which is of thinner metal is press-fitted into the shell 90, the inner shell being somewhat S-shaped in cross-section so as to provide both a pushing surface for installation purposes and a retainer for the spring.

Figure 17:
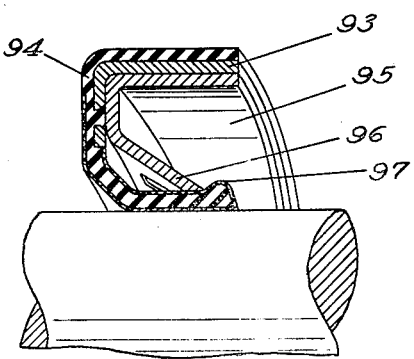
Figure 17 is a still further embodiment of the invention wherein the usual garter spring is eliminated.

In Figure 17, the shell 93 has a diaphragm 94 vulcanized thereto as in Figure 16 and an inner shell 95 of a spring material is fitted into the original shell or cup 93, the inner shell having a plurality of spring fingers 96 which contact the adjacent lip or shaft-contacting portion of the diaphragm thereto forcing the same against the shaft at all times. A hump 97 is molded into this outer lip of the diaphragm against which the spring fingers 96 may act, and this hump also prevents accidental or unauthorized withdrawal of the inner shell and resilient element 95.

In Figure 19, an embodiment of the invention somewhat similar to the structures shown in Figures 3 and 4 is illustrated wherein there is both a metal and composition contact with the inner face of a surrounding housing (not shown). It will be noted that the diaphragm 98 is molded into a cup-shaped shell 99 L-shaped in cross-section with a portion of the diaphragm adapted to sealingly contact a shaft 100. The diaphragm, however, does not extend completely over the outer surface of the shell 99, there being a further L-shaped shell 101 fitted over this portion of the inner shell, the shell 101 being also L-shaped in cross-section and preferably of slightly heavier metal than the material of the shell 99 and also somewhat thicker than the diaphragm element 98. This is particularly advantageous when the device is fitted into a housing as the metal of the shell 101 is compressed in position in the housing, the same being always made slightly oversize so far as the internal diameter of the housing is concerned, and the external diameter of the outer sealing portion of the diaphragm 98 is also made slightly larger than the internal diameter of the corresponding housing only not to so great an extent as the thickness of the metal 101.

Therefore, on application, the metal portion is compressed and as oftentimes occurs in these installations, the surrounding housing may be somewhat out of round or have score marks or the like therein, in which event the metal-to-metal contact will permit leakage. The fact that the resilient material of the composition diaphragm 98 is also slightly compressed on application and which, furthermore, acts as a cork does when being positioned in a bottle, will eliminate and completely seal against any possible leaks which might occur between the adjacent metal portions.

In Figure 9, the sealing element is adapted to rotate with the shaft 102 and consists of a metal shell 103 having a diaphragm 104 molded thereon, the same being then press-fitted onto a shaft with the outer periphery of the diaphragm adapted to sealingly contact the inner surface of a surrounding housing 105. Spring fingers 106 are made integral with the cup-shaped metal element 103 so that the outer periphery of the diaphragm 104 is always pushed outwardly and into proper sealing relationship with the interior face of the housing 105.

In all these structures, the material of the diaphragm, being vulcanized to the metal shell, cannot possibly turn with regard thereto, and inasmuch as the metal shell is quite firmly held in position in either the surrounding housing or on the rotating shaft, no undesirable movement of the diaphragm or other sealing structure can possibly take place. The combination, in one structure, of both an inner and outer seal, which may be an integral structure, is believed to be novel, and the invention enables the use of a minimum number of parts, which is, of course, important in commercial construction. Furthermore, the corklike sealing structure of the rubber or other composition on the outer face of the metal shell either by itself or when associated with an adjacent metal sealing structure produces an absolutely leak-tight structure which is efficient under all conditions of use including variations in temperature, pressure and also the innumerable varieties of lubricating oils and compounds employed.

The molding of the diaphragm to a metal shell, which, for the most part, is spaced away a considerable distance from the associated shaft or other element, provides for a greater flexibility of the sealing diaphragm structure, thereby allowing, in a much greater measure, for the possible eccentricities or wobblings of the shaft or similar structure. A greatly increased wiping surface is also rendered possible by the exercise of this invention.

It will be evident that herein is provided an oil seal which combines all the advantages of a steel housing or supporting shell with a flexible diaphragm and which, furthermore, includes an additional sealing structure around the outer face of the metal shell or cup which will positively insure against any leakage between the shell and the surrounding housing even though there may be some slight discrepancies in sizes. Such a structure, particularly those wherein the outer sealing point is integral with the diaphragm, provides a much more positive and satisfactory sealing action, and, furthermore, produces a simple more easily manufactured oil seal and one which, on account of its molded structure, can be made very attractive so far as the trade is concerned.

Various plastics or sealing elements may be used either in conjunction with the diaphragm or separate therefrom, the main object being a compressible sealing composition either wholly or partially covering the entire contacting face of the sustaining shell whereby a better and more positive and strictly oil-tight seal with a surrounding housing is effectively produced.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A fluid seal, comprising a cup-shaped shell, a flexible sealing element mounted on the shell and adhesively applied to at least two faces thereof, one face comprising the outer rim of the shell, a portion of the outer face of the shell being bare and adapted to afford a metal-to-metal contact with a surrounding housing.

2. A fluid seal, comprising a cup-shaped shell, a flexible sealing element mounted on the shell and adhesively applied to at least two faces thereof, one face comprising the outer rim of the shell, a portion of the outer face of the shell being bare and adapted to afford a metal-to-metal contact with a surrounding housing, and a reinforcing washer positioned in the shell adjacent such metal-to-metal contact.

3. A fluid seal, comprising a cup-shaped annular shell, a flexible sealing element mounted on the shell and adhesively applied to at least two faces thereof, one face comprising the outer rim of the shell for sealing contact with a surrounding housing, the flexible sealing element comprising a plastic and a fabric in vulcanized molded relationship, the fabric extending over the shaft sealing portion of the flexible element, and the plastic alone extending over the housing sealing portion of the element.

4. A fluid seal for rotatable shafts, comprising an open cup-shaped shell, a flexible sealing element mounted on the shell and adhesively applied to at least two faces thereof adapted to contact both the shaft and the housing, in which the seal is positioned, the flexible sealing element comprising a plastic and a fabric in vulcanized molded relationship, the fabric extending over both the shaft sealing and the housing sealing portion of the flexible element.

5. A fluid seal, comprising a cup-shaped shell, a flexible sealing element mounted on the shell and adhesively applied to at least two faces thereof, one face comprising the outer rim of the shell, one edge of the cup-shaped shell being inturned to provide a pushing surface.

6. A fluid seal for shafts and housings, comprising a cup-like shell L-shaped in cross-section, a flexible packing element vulcanized to both outer faces of the shell, the packing element having an inwardly projecting cylindrical portion adapted to sealingly contact the shaft, and the outer portion of the packing element adapted to sealingly contact the inner face of the surrounding housing, and an integral outwardly turned flange on the shell also adapted to contact the housing.

7. A fluid seal, comprising a cup-shaped shell, a flexible sealing element mounted on the shell and adhesively applied to at least two faces thereof, one face comprising the outer rim of the shell, a portion of the outer face of the shell being bare and adapted to afford a metal-to-metal contact with a surrounding housing, the bare outer face of the shell being of a slightly greater diameter than the corresponding adjacent outer face of the flexible sealing element.

JOSEPH B. VICTOR.